Sept. 27, 1938.  J. R. McGIFFERT ET AL  2,131,479
LOADING HOIST
Filed July 11, 1936  3 Sheets-Sheet 1
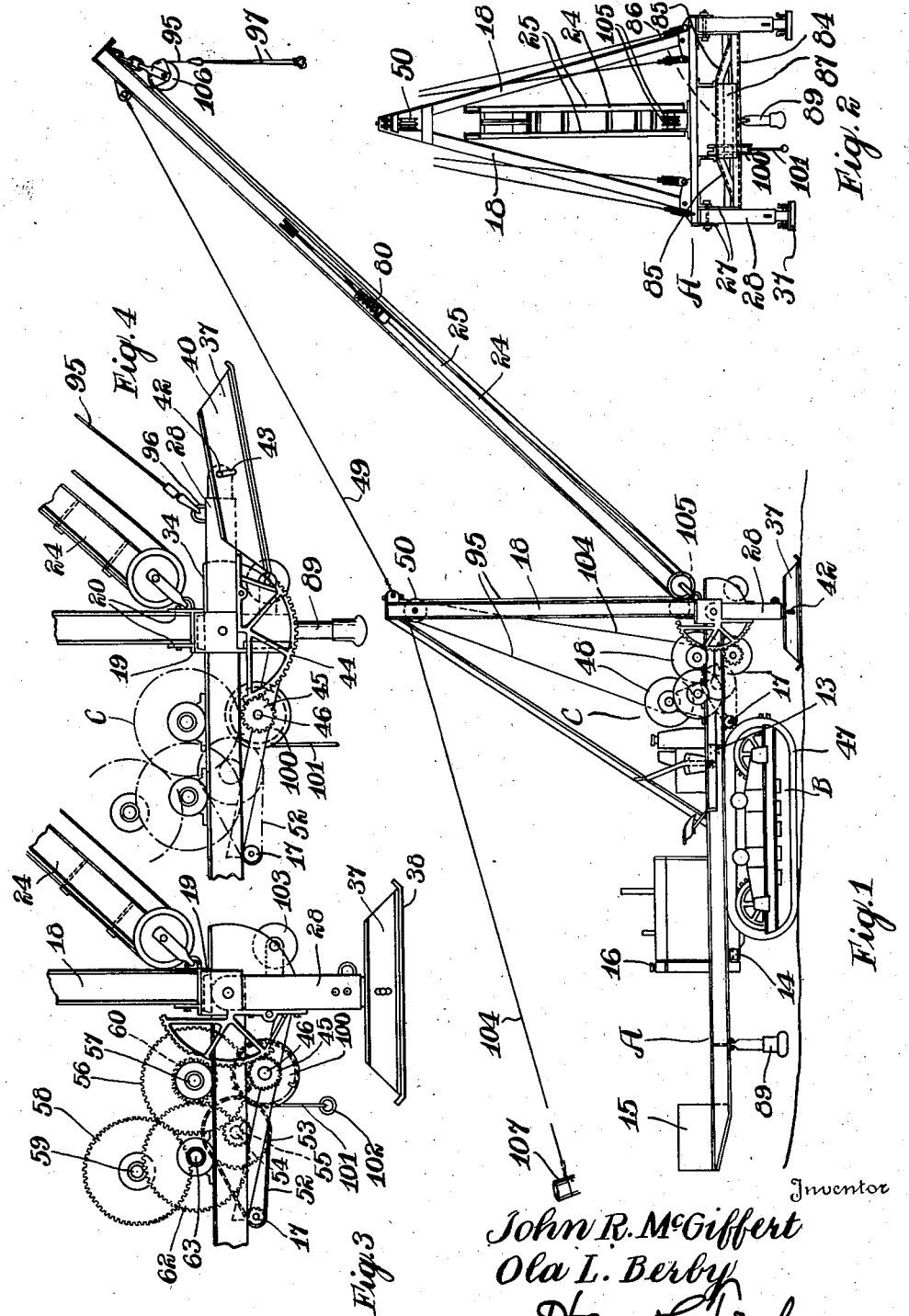
Inventor
John R. McGiffert
Ola L. Berby
By Howard L. Fischer
Attorney Sept. 27, 1938. J. R. McGIFFERT ET AL 2,131,479
LOADING HOIST
Filed July 11, 1936 3 Sheets-Sheet 2
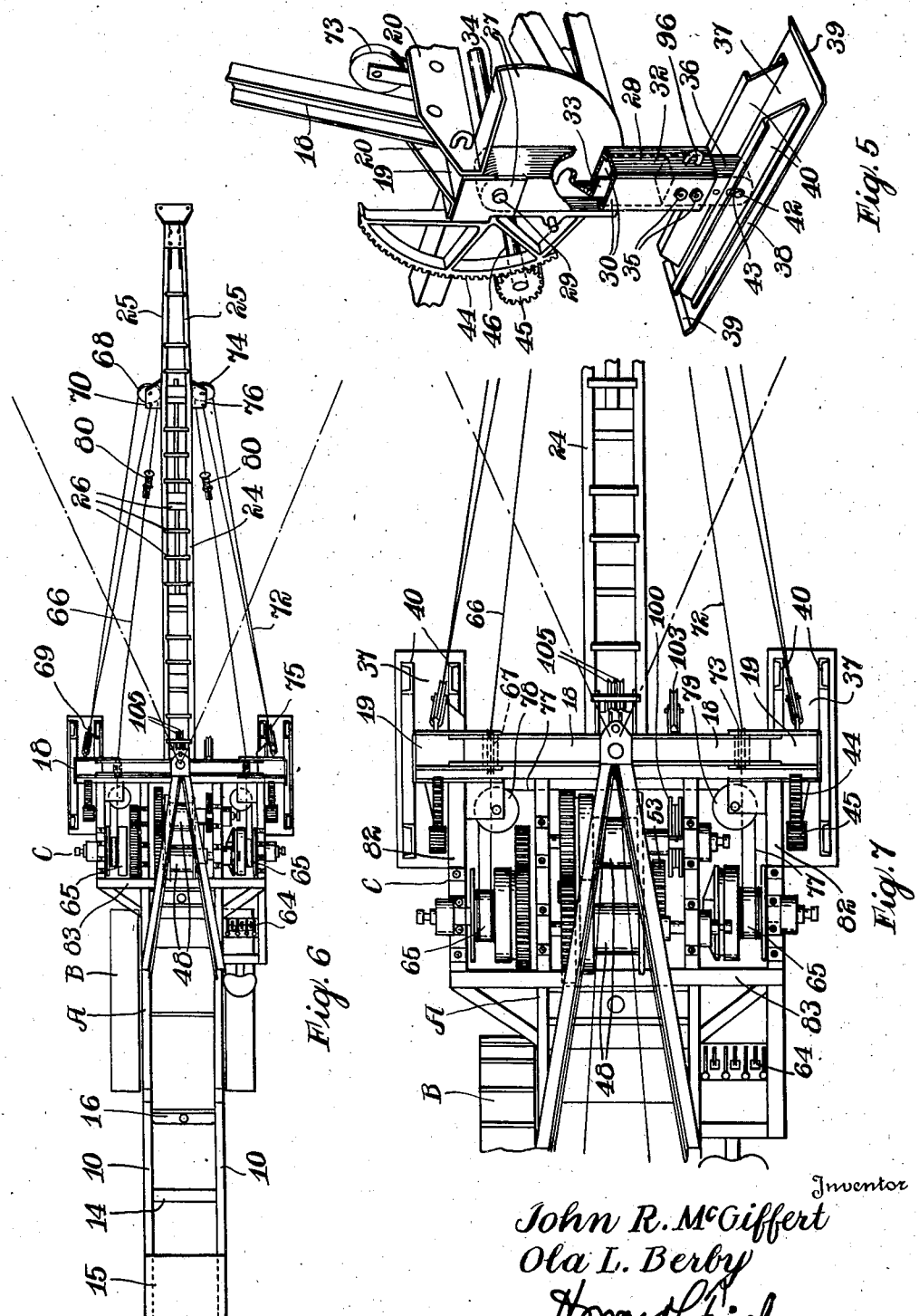
Inventor
John R. McGiffert
Ola L. Berby
By Howard L. Fischer
Attorney

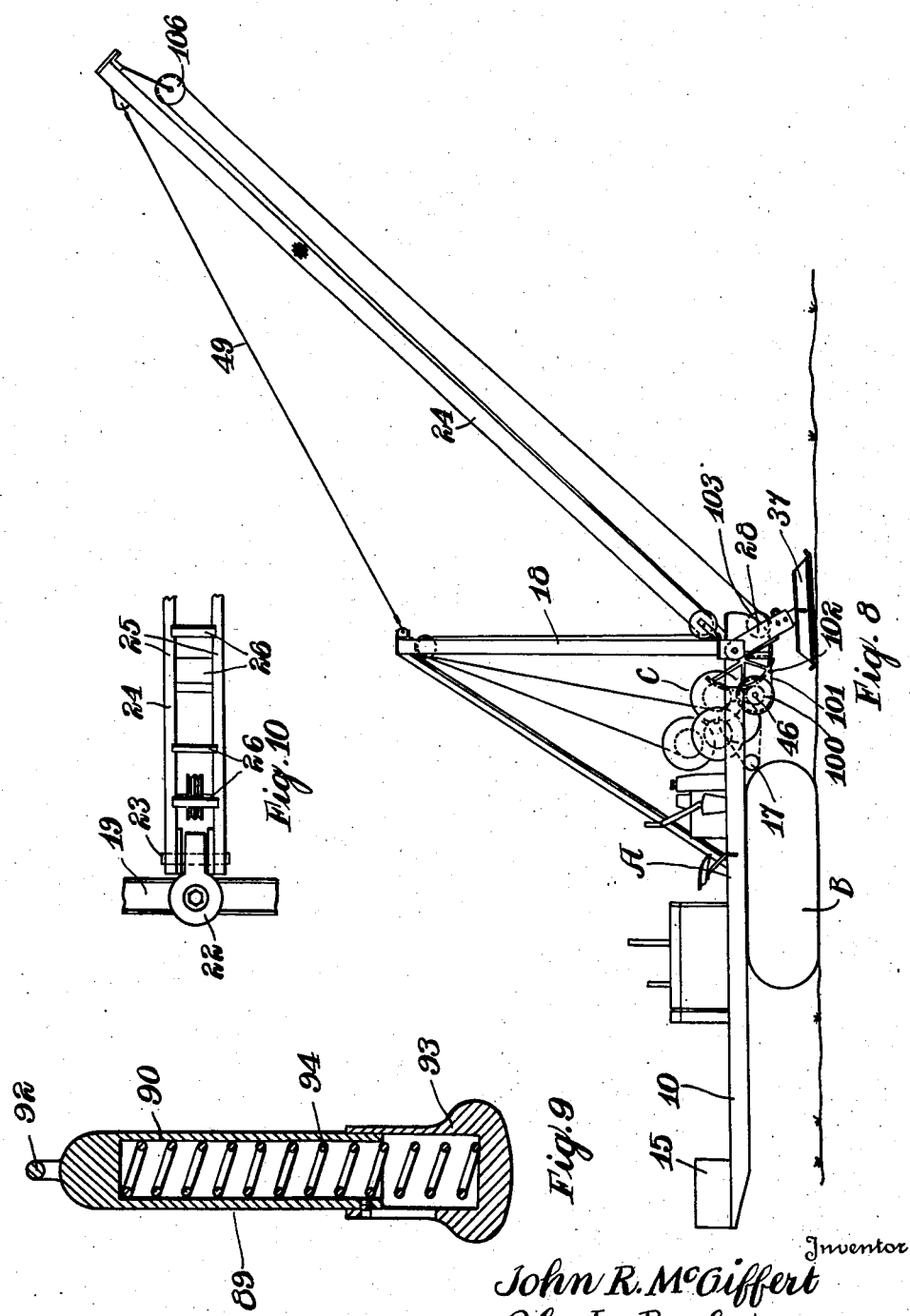

Patented Sept. 27, 1938

2,131,479

UNITED STATES PATENT OFFICE 2,131,479

LOADING HOIST

John R. McGiffert and Ola L. Berby, Duluth, Minn., assignors to Clyde Iron Works, Duluth, Minn., a corporation of Minnesota Application July 11, 1936, Serial No. 90,148

12 Claims. (Cl. 212—145)

Our invention relates to an improvement in loading hoists of a type designed to be readily movable from one position to another and which is particularly designed for use in loading logs on trucks, sleighs, or other vehicles, and is adaptable for general hoisting and material handling, steel erection, pile driving, and clam shell and bucket work.

Loading devices due to their size and weight are naturally difficult to move from one position to another. We have found that where loading devices have been mounted upon crawler units or the like, they are often top heavy and unstable and are unable to lift heavy loads at any great distance from the hoist.

It is a feature of our invention to provide a loader which is readily portable and yet which is firmly supported during loading operation. This feature is accomplished by providing rigid legs pivoted to the frame of the loader in such a manner that they may be raised out of operative ground engaging position during the movement of the loader from one position to another, and yet which may firmly support the loader during loading operation.

It is a feature of our invention to provide a loader mounted upon a tractor preferably of the crawler type provided with supporting legs for one end of the frame which may be operated in unison into contact with the ground. The movement of the tractor toward the legs may act to pivot the same into upright position to rigidly support one end of the loader frame. The legs are of sufficient length to relieve the weight on one end of the tractor, so that the loader is entirely supported by the rigid legs and the spring supported end of the tractor.

Our invention resides in providing a loader which is mounted upon a standard tractor and which is balanced in such a manner that the center of gravity of the device coincides with the center of gravity of the tractor itself. In this manner, the pitching of the loader during movement thereof is to a large degree eliminated.

It is a feature of our invention to provide a loader comprising a frame mounted upon a tractor and extending beyond the ends thereof and having at one end of the frame a live boom and a double drum hoist operated by power supplied by the tractor engine. The other end of the frame is provided with a counter-weight to counter-balance the weight of the hoisting equipment. The load is in this way counter-balanced during movement of the hoist. By providing the rigid legs at the extreme end of the frame supporting the hoisting equipment a heavy load may be lifted at the end of the boom and which is counter-balanced by the weight of the hoist and tractor as well as by the counter-weight.

These and other novel features and objects of our invention will be clearly and fully set forth in the following specification and claims.

In the drawings forming a part of this specification:

Figure 1 is a side elevation view of our loader in loading position.

Figure 2 is a front elevation view of the same with the boom cut off and the hoisting machinery omitted to show the detail of the construction of the front.

Figure 3 is an enlarged view of the front end of the hoist frame, disclosing the leg of the frame in lowered position.

Figure 4 is a view similar to Figure 3, showing the pivoted legs in raised position.

Figure 5 is a perspective view of one of the pivoted legs, disclosing the construction thereof.

Figure 6 is a top plan view of our loader.

Figure 7 is an enlarged detail of the hoisting equipment.

Figure 8 is a diagrammatic side elevation view, disclosing the legs in partially uprighted positon.

Figure 9 is a sectional view through a detail portion of our device.

Figure 10 is a diagrammatic plan view illustrating the manner in which the live boom may be supported to the loader frame.

Our loader A is provided with a frame having a pair of spaced channels 10 which are secured intermediate their ends to a tractor B. The attachment of the channels 10 to the tractor B may vary with the type of tractor used and in the type disclosed, bolts directly at 13 to the frame at one end of the tractor and is secured adjacent the other end by means of brackets 14. The channels 10 are connected by suitable cross members, such as 14, and are provided at one end with a counter-balance box 15 within which may be placed sufficient ballast of any desirable type to cause the center of gravity of the assembled loader to coincide with that of the tractor B alone. The ballast box 15 is placed at the end of the frame projecting forwardly from the front 16 of the tractor. A hoist C is mounted on the frame to the rear of the tractor B, as will be more clearly described in detail. Power of operation of the hoist is provided by means of the power take-off shaft sprocket 17.

At the rear ends of the channels 10 we provide a vertical A-frame 18 comprising a pair of channels secured at their lower extremities to a cross member 19 extending transversely across the channels 10 and projecting somewhat beyond the channels 10. The channels forming the A-frame 18 are preferably secured to plates 20 which in turn are secured to the cross channel 19.

Centrally between the channels 10 and mounted upon the cross member 19, we provide a bevel connection 22 which is hingedly secured at 23 to a live boom 24. The boom 24 is constructed of special alloy steel of moderate weight and ample strength. The boom comprises a pair of oppositely disposed channels 25 connected by cross members 26 at spaced points.

Spaced plates 27 depend downwardly from each end of the cross channel 19 to accommodate legs 28 which are hingedly supported therebetween by means of a pivot pin 29. In the form illustrated, the legs 28 comprise a pair of channels 30 which are oppositely disposed and connected along one side of the covering plates 32. The inner plates 27 adjacent each leg are provided with a flange 33 which projects into the body of the leg adjacent the inner channel 30 when the leg is in upright position as may be seen in Figure 5 of the drawings.

This flange 33 acts to hold the leg with which it engages from side movement when the leg is in this upright position. A flange 34 on the inner plates 27 limits the upward movement of the legs 28 when the legs are drawn into inoperative position, as illustrated in Figure 4 of the drawings. The channels 30 are adjustably connected by bolts 35 or other suitable means to a pivot end 36 which is pivotally connected to the shoe 37. Each shoe 37 is provided with a bearing plate 38 having upturned ends 39 to which is secured a pair of upright channels 40. The pivot end 36 of each leg 28 is provided with a transversely extending pin 42 extending through slots 43 in the channels 40. Accordingly, the legs 28 are pivotally connected to the shoes 37 so that the shoes may maintain a substantially horizontal position by their own weight even when in inoperative position.

Each leg 28 is provided with a gear segment 44 attached along one side thereof which is engageable with a pinion 45 on a transversely extending shaft 46. As the pinions 45 are both secured for rotation with the shaft 46, it may be seen that the legs 28 pivot in unison to prevent one leg from assuming a vertical position before the other due to uneven ground surface.

The legs 28 with the shoes 37 are somewhat longer than the normal distance between the frame and the surface of the ground. Accordingly, when the legs are being pivoted into vertical position they are allowed to pivot down into contact with the ground as shown in Figure 8 of the drawings. The tractor B is then driven rearwardly for a short distance, the shoes 37 engaging the ground and pivoting into the vertical position illustrated in Figures 1 and 3. A means is provided which will be later described to assist in drawing the legs 28 into vertical position in case the surface of the ground is too smooth to be engaged by the shoes 37 as the tractor B is moved rearwardly. Due to the fact that the legs 28 are somewhat longer than the normal distance between the pivot point and the surface of the ground when the legs are drawn into vertical position, the rear end 47 will be raised slightly from the surface of the ground. In the tractor B disclosed, the front end 16 thereof is spring suspended, while the rear end is the rigidly supported end of the tractor, and accordingly the loader A is supported entirely by the legs 28 and by the spring suspended end of the tractor B. This fact enables the loader to be erected upon somewhat uneven ground without straining the frame work and provides the equivalent of a three-point mounting rather than a four-point support as would be found if the rigidly supported end of the tractor remained in contact with the surface of the ground.

The hoist C disclosed, is provided with two cable drums 48, each or either of which may be used separately or simultaneously. In normal operation, the boom 24 is connected to the top of the A-frame by a tie cable 49 so that the reach of the boom remains constant during the loading operation. The boom 24, however, may be raised above this position upon occasion by a cable operable upon one of the cable drums 48 and extending through a sheave 50 at the top of the A-frame and connected to the outer extremity of the boom 24.

The manner in which the various cables are driven is best illustrated in Figure 3 of the drawings. From the power take-off 17 of the tractor B, a chain 52 operates a sprocket 53 on a shaft 54 upon which is mounted a pinion 55. The pinion 55 meshes with a gear 56 on a shaft 57. The gear 56 engages the gear 58 on a shaft 59. A gear 60 on the shaft 57 engages a gear 62 on a shaft 63. One of the cable drums 48 is mounted upon the shaft 57, while the other is mounted upon the shaft 59. Suitable clutches are provided between the gears 56 and 58 controlled by a control mechanism 64 diagrammatically shown in Figures 6 and 7, but which is not disclosed in detail as this mechanism is well known in the art. Suitable brake bands are also provided which are not shown in the drawings to prevent confusion.

Upon the shaft 63 is mounted a pair of friction drums 65 as may be seen in Figure 7, which are also controlled by suitable controls 64. A cable 66 is wound upon one friction drum 65, passes through a sheave 67 to a sheave 68 on the boom 24. The cable 66 passes over the sheave 68 through a pulley 69 mounted on the adjacent end of the cross channel 18 and is secured to the sheave bracket 70 of the sheave 68 on the boom 24. The other friction drum 65 is likewise provided with a cable 72 passing through a sheave 73 on the frame, through a sheave 74 on the boom, back through a pulley 75 on the adjacent end of the cross member 18, and is ended at the sheave bracket 76 on the boom 24. Movement of one of the drums 65 will act to pivot the boom toward the engaged friction drum 65 while the cable will pay out from the opposite friction drum 65. In order to prevent slack in the cables 66 and 72, we provide a cable 77 terminating on one drum 65 and passing through sheaves 78 and 79 with its other end secured to the opposite friction drum 65. This cable 77 causes the drums to move uniformly and to pay out an amount of cable from one drum 65 which is wound upon the other drum. Spring bumpers 80 are mounted on the cables 66 and 72 to limit the swinging of the boom within the desired arc.

The hoist C is somewhat wider than the distance between the channels 10, and is additionally supported by angles 82 parallel to the channels 10 and supported by transverse channels 83 and 19. The cross channel 19 is reinforced by a girder arrangement between the inner plates 27. This construction comprises a cross channel 84 below and parallel to the channel 19. From the outer ends of the channel 84, channels 85 are secured slanting inwardly and upwardly to another shorter cross channel 86 secured beneath the ends of the channels 10. A plate 87 is welded or otherwise attached between the cross channels to form a truss or girder reinforcement for the center of the cross channel 19 upon which the boom 24 is pivotally attached. The A-frame 18 is also reinforced by angles 88 extending from the top of the A-frame 18 to a point on the channels 19 forwardly of the A-frame.

Depending from the cross channel 84 at one end of the channels 10, and from a cross member 14 near the other end thereof, we provide bumper means to dampen any tendency of the assembled loader to pitch during movement over rough ground surface. These bumpers 89 are merely linked in position, to swing freely over obstacles. Each bumper 89 comprises a cylinder 90 having a loop 92 thereon for connection with the loader frame, and a bearing end 93 slidably connected to the lower end thereof. A spring 94 is interposed between the cylinder 90 and the bearing end 93 thereon within the cylinder, and acts to cushion any longitudinal rocking of the loader frame.

From the foregoing description, the operation of our loader is believed readily understood. In moving from one position to another, the legs 28 are in raised position, and are held in this position by means of the load cable 95 on one of the cable drums 48, which is engaged in a loop 96 on each leg 28. Where the loader A is being used for loading logs or the like, a sling 97 is ordinarily used having two hooks connected to a connecting ring on the cable 95. One of these hooks may be inserted through the loop 96 on each leg in drawing the legs 28 into inoperative position, shown in Figure 4.

When it is desired to operate the loader, the tractor is moved to the desired point, and the load cable 95 is lowered, the shoes 37 contacting the surface of the ground. The cable 95 is removed from the loops 96, and the tractor B moved rearwardly until the legs are pivoted into upright position. Pins 98 may then be inserted through the legs and into the inner plate 27 as shown in Figure 5, to hold the legs in upright position.

In some cases the surface of the ground upon which the loader is to be operated is smooth or slippery, and rearward movement of the tractor B when the shoes 37 are in partially erected position illustrated in Figure 8 merely slides these shoes over the surface of the ground. To avoid trouble in such cases in properly erecting the legs, we provide a sheave 100 on the shaft 46 having a short length of cable 101 secured thereto with a ring 102 on its free end. The load cable 95 is carried over the sheave 103 on the cross channel 84 and attached to the ring 102. By exerting a pull on the load cable 95 as the tractor B moves rearwardly, the sheave 103 is rotated, turning the shaft 46 and the pinion 45, forcibly erecting the legs as the tractor moves.

The cables 95 and 104 from the two drums 48 may be used simultaneously or separately and individually as desired. As has been stated, one cable may be used for raising the boom 24 if desired. When used for raising a load, the cable 95 passes over one of a pair of sheaves 50 at the top of the A-frame, over one of a pair of sheaves 105 at the base or pivoted end of the boom 24, and through a sheave 106 at the free end of the boom. The other load line 104 may pass through the others of the pairs of sheaves 50, 105, 106, if desired. This line 104 may also be used as a drag line, or as a guy line by extending it through one of the pulleys 50 in the opposite direction from that usually used, and by anchoring the line to a fixed anchor 107 at a point in front of the tractor B.

When it is desired to change the position of the loader, the setting up procedure is reversed. The pins 98 are first removed, and the tractor B is then driven forwardly until the legs 28 assume the position illustrated in Figure 8 of the drawings. The load line 95 is then attached to the loops 96 of the legs, and the legs drawn upwardly into the position illustrated in Figure 4 of the drawings.

When the legs 28 are in supporting position, the loader rests entirely upon the legs 28 and upon the spring supported end of the tractor B. In tractors of the crawler type, one end of each tread is spring supported; and it is desired to have this end contact the ground so as to compensate for uneven ground, and to prevent strain on the frame of the loader.

In accordance with the patent statutes, we have described the principles of operation of our loading hoist; and while we have endeavored to set forth the best embodiment thereof, we desire to have it understood that this is only illustrative of a means of carrying out our invention, and that obvious changes may be made within the scope of the following claims without departing from the spirit of our invention.

We claim:

1. A tractor supported hoist in combination with a tractor comprising a frame secured to said tractor, a pair of supporting legs secured to one end of said frame, aligned pivots connecting said legs to said frame and means connecting said legs to pivot in unison.

2. A tractor supported hoist in combination with a tractor comprising a frame longitudinally secured to said tractor, a hoisting unit on said frame, legs on said frame longitudinally spaced from said tractor, aligned pivots connecting said frame and legs, and means connecting said legs to operate said legs in unison.

3. A tractor supported hoist in combination with a tractor comprising a frame longitudinally secured to said tractor, legs pivotally secured on transversely aligned pivots to said frame, bearing shoes pivotally mounted on said legs, and means connecting said legs to pivot the same in unison.

4. A hoisting device in combination with a tractor including a frame secured to the tractor and extending beyond one end thereof, supporting means for said extended end of said frame pivotally secured to said extended end and movable into vertical position, and means engageable with said supporting means to lock the same in vertical position, said locking means including a locking pin, said supporting means being of sufficient length to take the weight off one end of said tractor.

5. A hoisting device in combination with a supporting vehicle having longitudinally spaced weight supporting points, including a frame extending beyond said weight supporting points, supporting means pivotally connected to said frame beyond said weight supporting points and movable into vertical position, means locking said supporting means in vertical position, said locking means including a locking pin said supporting means being of sufficient length to raise said end of said frame to take the weight off one of said weight supporting points.

6. A hoisting device in combination with a supporting vehicle including a frame secured on said vehicle, a supporting means on said frame longitudinally pivotal into and out of engagement with the surface of the ground, and shoulder means on said frame engageable with said supporting means at a point spaced from the pivot thereof when said supporting means is in engagement with the ground to limit transverse movement in either direction of said supporting means.

7. A hoisting device in combination with a supporting vehicle including a frame on said vehicle, a pair of supporting means on one end of said frame pivotally engageable with the ground, a pivotally supported shaft, means connecting said shaft and supporting means to rotate said shaft when said supporting means is pivoted, and means on said shaft for pivoting said supporting means in either direction.

8. A hoisting device in combination with a supporting vehicle including a frame extending substantially beyond the vehicle, and resilient bumper means depending from said frame engageable with the ground and normally spaced from the ground to mollify any pitching thereof.

9. A hoisting device in combination with a supporting vehicle including a frame extending beyond said vehicle, and bumper means swingably depending from said frame into normal spaced relation with the ground adapted to dampen any pitching of said vehicle by engagement with the ground, and to pass freely over obstructions.

10. In a loading hoist, a tractor, a frame on said tractor extending substantially beyond the ends of said tractor, and a bumper means swingably depending from said frame adjacent each end thereof, said bumper means normally depending to a point spaced slightly from the surface of the ground, said bumper means resiliently compressible when forced downwardly upon the ground.

11. In a loading hoist, a supporting tractor, a frame extending beyond said tractor, a bumper depending from said depending end to a point normally spaced from the ground, said bumper comprising a pair of telescopically arranged members, and a spring normally holding said members extended, said spring permitting said members to compress when said bumper strikes the ground.

12. In a loading hoist, a tractor, a frame thereupon, a pair of pivotally mounted legs on one end of said frame pivotally movable into engagement with the ground, shoulder means on said frame limiting the pivotal movement of each of said legs, and flange means on said frame engageable with each said leg when said leg is in contact with said shoulder to prevent axial side movement of said legs with respect to said frame.

JOHN R. McGIFFERT.
OLA L. BERBY.